United States Patent
Quick et al.

(10) Patent No.: US 7,287,760 B1
(45) Date of Patent: Oct. 30, 2007

(54) VEHICLE SUSPENSION SYSTEM AND METHOD

(75) Inventors: Craig E. Quick, Whitestown, IN (US); Daniel L. Nordmeyer, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 11/507,141

(22) Filed: Aug. 21, 2006

(51) Int. Cl.
B60G 17/016 (2006.01)

(52) U.S. Cl. ............................. 280/5.512; 280/5.507; 280/5.514; 280/5.515; 701/40

(58) Field of Classification Search ............... 280/5.5, 280/5.507, 5.512, 5.514, 5.515, 5.501; 701/37
See application file for complete search history.

(56) References Cited

U.S. PATENT DOCUMENTS

| | | | | |
|---|---|---|---|---|
| 4,634,142 A * | 1/1987 | Woods et al. | ............ | 280/5.503 |
| 5,075,855 A * | 12/1991 | Sugasawa et al. | ............ | 701/37 |
| 5,369,581 A * | 11/1994 | Ohsuga et al. | ................ | 701/48 |
| 5,533,597 A * | 7/1996 | Nezu et al. | ............... | 188/266.4 |
| 5,582,385 A * | 12/1996 | Boyle et al. | ................ | 248/550 |
| 5,627,751 A * | 5/1997 | Davis et al. | .......... | 364/424.034 |
| 5,652,704 A * | 7/1997 | Catanzarite | ................ | 701/49 |
| 5,732,370 A * | 3/1998 | Boyle et al. | ................ | 701/37 |
| 5,908,456 A * | 6/1999 | Wahlers | ....................... | 701/37 |
| 5,941,920 A | 8/1999 | Schubert | | |
| 5,964,455 A * | 10/1999 | Catanzarite et al. | ........ | 267/131 |
| 6,000,703 A * | 12/1999 | Schubert et al. | ......... | 280/5.518 |
| 6,029,764 A | 2/2000 | Schubert | | |
| 6,070,681 A * | 6/2000 | Catanzarite et al. | ..... | 180/89.15 |
| 6,098,994 A * | 8/2000 | Kunishima et al. | ...... | 280/5.514 |
| 6,314,353 B1 | 11/2001 | Ohsaku et al. | | |
| 6,366,841 B1 | 4/2002 | Ohsaku | | |
| 6,370,458 B1 * | 4/2002 | Shal et al. | ................... | 701/37 |
| 6,526,342 B1 * | 2/2003 | Burdock et al. | .............. | 701/37 |
| 6,575,484 B2 * | 6/2003 | Rogala et al. | ........ | 280/124.158 |
| 6,671,596 B2 * | 12/2003 | Kawashima et al. | .......... | 701/37 |
| 6,712,409 B2 * | 3/2004 | Monig | ..................... | 292/336.3 |
| 6,721,641 B1 * | 4/2004 | Denne | ......................... | 701/37 |
| 6,873,890 B2 * | 3/2005 | Song | ........................... | 701/37 |
| 6,898,501 B2 * | 5/2005 | Schubert | ..................... | 701/50 |
| 6,923,298 B2 * | 8/2005 | Tanner | ...................... | 188/267 |
| 6,959,932 B2 * | 11/2005 | Svartz et al. | ............ | 280/5.514 |
| 7,035,836 B2 * | 4/2006 | Caponetto et al. | ........... | 706/47 |
| 7,051,851 B2 * | 5/2006 | Svartz et al. | ............... | 188/300 |

(Continued)

Primary Examiner—Paul N. Dickson
Assistant Examiner—Karen J. Amores
(74) Attorney, Agent, or Firm—Fay, Sharpe, Beall, Fagan, Minnich & McKee, LLP; Michael R. Huber

(57) ABSTRACT

A control system is operatively associated with a suspension system of a vehicle. The associated suspension system includes an associated fluid spring operating at an associated fluid pressure and an associated variable-rate damper having an associated electronically-variable damping rate. The control system includes a pressure sensor operative to generate a pressure sensor signal indicative of the associated fluid pressure of the associated fluid spring, and a controller in communication with the pressure sensor and the associated variable-rate damper. The controller is operative to receive the pressure sensor signal and generate a damper adjustment signal based at least partially on the pressure sensor signal for adjusting the associated electronically-variable damping rate of the associated variable-rate damper. A vehicle suspension system includes such a control system, and a method of controlling a suspension system of a vehicle is also included.

19 Claims, 4 Drawing Sheets

U.S. PATENT DOCUMENTS

| | | |
|---|---|---|
| 7,076,351 B2 * | 7/2006 | Hamilton et al. .............. 701/37 |
| 7,092,808 B2 * | 8/2006 | Lu et al. ........................ 701/70 |
| 2002/0032508 A1 * | 3/2002 | Uchino et al. ................ 701/37 |
| 2002/0045977 A1 * | 4/2002 | Uchiyama et al. ............ 701/37 |
| 2002/0138186 A1 | 9/2002 | Kim |
| 2002/0185827 A1 * | 12/2002 | Caponetto et al. ............ 280/5.5 |
| 2003/0001346 A1 * | 1/2003 | Hamilton et al. ......... 280/5.515 |
| 2003/0075881 A1 * | 4/2003 | Delorenzis et al. ........... 280/5.5 |
| 2003/0200016 A1 | 10/2003 | Spillane et al. |
| 2004/0026879 A1 * | 2/2004 | Schaumburg et al. ......... 280/5.5 |
| 2005/0021205 A1 * | 1/2005 | Niwa et al. .................... 701/37 |
| 2005/0146098 A1 * | 7/2005 | Green et al. .............. 280/5.508 |
| 2006/0055129 A1 * | 3/2006 | Amano ..................... 280/5.507 |
| 2006/0181034 A1 * | 8/2006 | Wilde et al. .............. 280/5.515 |
| 2006/0267297 A1 * | 11/2006 | Nordmeyer et al. ...... 280/5.515 |

* cited by examiner

VEHICLE SUSPENSION SYSTEM AND METHOD

BACKGROUND

The present novel concept broadly relates to the art of vehicle suspension systems and, more particularly, to a vehicle suspension system utilizing electronically-variable damping based upon an air spring pressure, and a method of controlling a vehicle suspension using the same.

The present novel concept finds particular application and use in conjunction with suspension systems of wheeled vehicles, and will be described herein with specific reference thereto. However, it is to be appreciated that the present novel concept is also amenable to use in other applications and environments, and that the specific uses shown and described herein are merely exemplary.

It is well known that land vehicles of most types and kinds are outfitted with a suspension system that supports a sprung mass of the vehicle (e.g., a body or chassis) on an unsprung mass of the vehicle (e.g., an axle or wheel-engaging member). Known suspension systems typically include a plurality of spring elements (e.g., coil springs, leaf springs, torsion springs and/or air springs) that are responsive to forces and/or loads acting on the sprung and/or unsprung masses of the vehicle. Additionally, known suspension systems commonly include a plurality of damping members for dissipating energy inputs, such as the forces and/or loads acting on the sprung and/or unsprung masses of the vehicle.

It is well understood, however, that damping members undesirably transmit road and other inputs to the sprung mass of a vehicle, and that the level of damping action of the damping member has a relation to the amount or magnitude of the road input that is transmitted through the damping member to the sprung mass of the vehicle. Typically, the more aggressive the damping action of the damping member, the greater amount of the road or other input that is transmitted to the sprung mass of the vehicle. Thus, a more comfortable ride is often achieved with a lower relative damping rate. However, it is also well understood that vehicle performance is affected by the level of damping action of a suspension system and that better handling and/or performance is normally achieved at higher damping rates. As a result, a vehicle manufacturer would, in many cases, compromise between performance and ride quality to avoid either an undesirable decrease in performance due to the use of too low a damping rate, or an undesirably rough ride due to the use of an overly aggressive damping rate.

In an effort to improve performance and/or ride quality of vehicles, suspension systems and/or components thereof have been developed that are operative to vary the damping rate of the damping members in response to inputs acting on the vehicle. One example of variable-rate dampers that are suitable for use in such a suspension system are air proportional dampers, which are well known and normally include an air spring as the operative spring member of the suspension system. Generally, air proportional dampers include valving that is adjusted to vary the damping rate of the damping members in a manner proportional to the changes in the air pressure of the air springs. That is, the valving is in fluid communication with the air spring so that changes in air spring pressure directly change the valving of the damper and, therefore, directly change the damping rate thereof.

However, air proportional dampers and the use thereof introduce certain problems and/or disadvantages that have resulted in the limited adoption and use thereof, at least in certain applications. One disadvantage is that air proportional dampers include various fluid volumes, fittings and connectors that can result in fluid leakage due to the loss of seal integrity at or along the numerous component interconnections. Another disadvantage is that these additional volumes and components utilize valuable space on the vehicle. This can be particularly problematic on smaller or esthetically oriented vehicles, such as passenger vehicles, pickup trucks and sport utility vehicles, for example, where available space for such components is minimal.

As an alternative to mechanically-variable damping members, electronically controlled dampers have been developed. Such devices are commonly used and can include dampers using magnetorheological damping fluid or electrorheological damping fluid as well as dampers using size-variable orifices that are adjustable using an electric motor. Such devices are commonly employed in suspension systems that utilize active or semi-active damping control in which the damping rate of the damping member is continually adjusted based upon road input conditions. That is, active and semi-active damping control schemes adjust the damping rate of the dampers in real time or near-real time based upon sensor signals corresponding to road and/or driving conditions. Generally, the purpose and goal of active and semi-active damping control schemes is to instantaneously sense and counteract road or other inputs to thereby prevent the inputs from reaching the sprung mass of the vehicle, or at least to substantially reduce the magnitude of the road inputs that reach the sprung mass of the vehicle.

However, to be able to sense a road input (e.g., a wheel impact with a pothole), receive and process the data and/or signals from various sensors related to the road input, and then instantaneously make the corresponding adjustments to the electrically adjustable dampers so that the road input can be counteracted before reaching the sprung mass of the vehicle, normally requires substantial processing power and a sophisticated control scheme. Thus, such systems typically operate on a continuous or nearly continuous basis, and are normally quite complex and expensive. As a result, the systems are less well suited for use on more economically priced vehicle models.

Other systems are also known that adjust the damping rate of one or more damping members. One example of such a system is disclosed in U.S. Pat. No. 5,582,385 ('385), which is directed to a method of controlling motion using an adjustable damper. As can be recognized from the '385 patent, however, such systems are often as equally complex as those used for active or semi-active control systems. For example, the '385 patent utilizes numerous components and control algorithms that are together used to calculate the magnitude of an input force acting on a mass. The system then instantaneously generates a counteracting response using a continuous force-controlled type damper.

Accordingly, it is desirable to develop a vehicle suspension system and method of controlling the same that overcomes the foregoing and other problems and disadvantages.

BRIEF DESCRIPTION

One embodiment of a control system in accordance with the present disclosure for an associated suspension system of an associate vehicle is provided. The associated suspension system includes an associated fluid spring operating at an associated fluid pressure and an associated variable-rate damper having an associated electronically-variable damping rate. The control system includes a pressure sensor operative to generate a pressure sensor signal indicative of the associated fluid pressure of the associated fluid spring.

The control system also includes a controller in communication with the pressure sensor and the associated variable-rate damper. The controller is operative to receive the pressure sensor signal and generate a damper adjustment signal based at least partially on the pressure sensor signal for adjusting the electronically-variable damping rate of the associated variable-rate damper.

One embodiment of a vehicle suspension system in accordance with the present disclosure for an associated vehicle having an associated unsprung mass and an associated sprung mass supported on the associated unsprung mass is provided. The vehicle suspension system includes a fluid spring assembly operatively disposed between the associated sprung and unsprung masses and operating at a fluid pressure. An adjustable-rate damping member is operatively disposed between the associated sprung and unsprung masses. A control system includes a pressure sensor and a controller. The pressure sensor is in communication with the fluid spring assembly and is operative to generate a pressure signal corresponding to the fluid pressure. The controller is also in communication with the pressure sensor for receiving the pressure signal and in communication with the adjustable-rate damping member. The control system is operable to determine a damping rate for the adjustable-rate damping member based at least in part on said pressure signal, generate a damper adjustment signal that corresponds to the determined damping rate, and communicate the damper adjustment signal to the adjustable-rate damping member.

An exemplary method according to the present disclosure of controlling a suspension system of a vehicle is provided. The suspension system includes an adjustable-rate damper and an air spring operating at an air pressure. The method includes providing a pressure sensor in communication with the air spring and generating a pressure signal having a relation to the air spring pressure using the pressure sensor. The method also includes providing an electronic controller in communication with the pressure sensor and the adjustable-rate damper. The method further includes communicating the pressure signal from the pressure sensor to the electronic controller, and determining a target damping rate using the electronic controller based at least partially on the pressure signal. The method also includes generating a damper adjustment signal having a relation to the target damping rate using the electronic controller and communicating the damper adjustment signal to the adjustable-rate damper. The method further includes altering the adjustable-rate damper for operation at approximately the damping rate using the damper adjustment signal.

DETAILED DESCRIPTION

Figure 1:
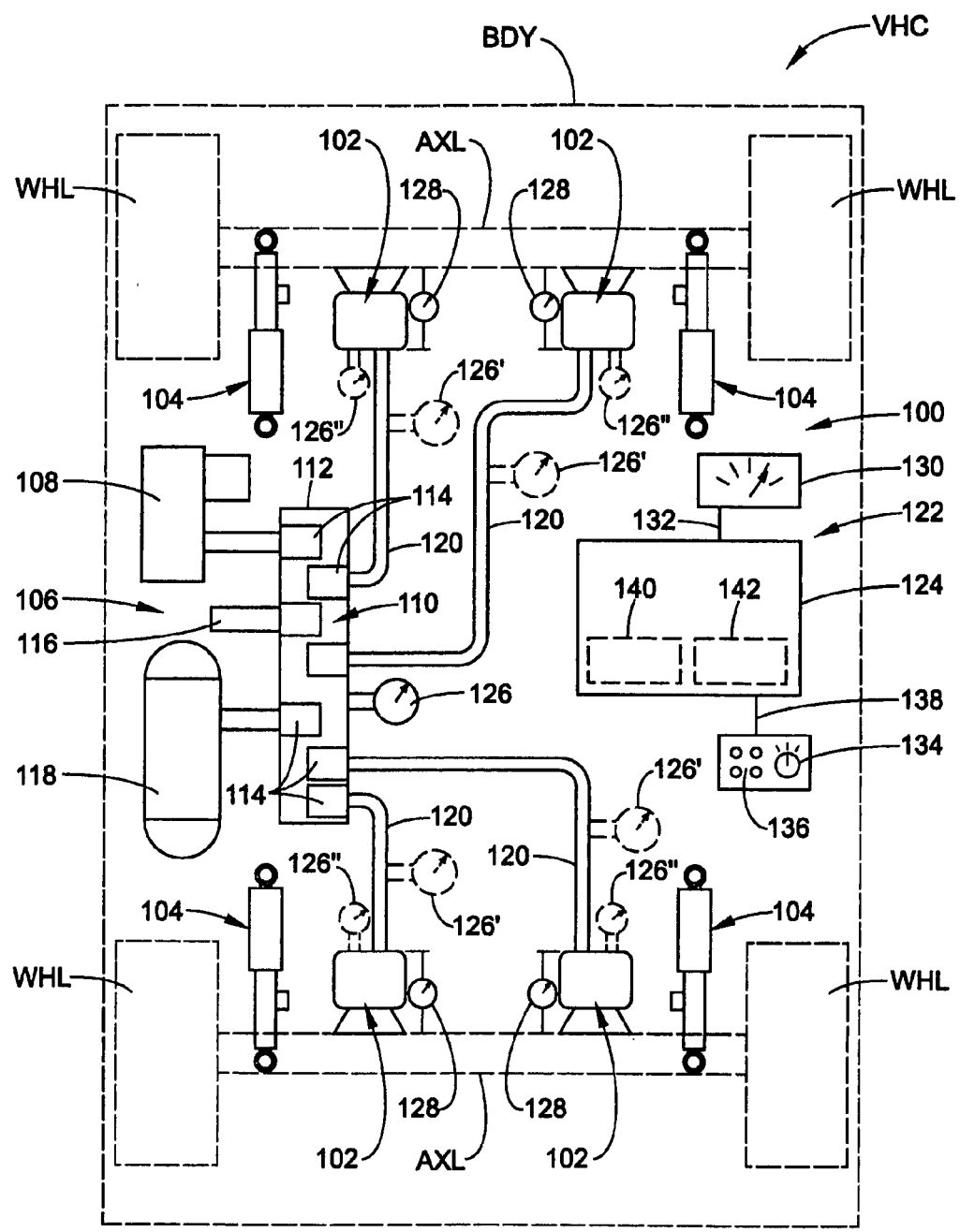
FIG. 1 is a schematic representation of one example of a suspension system in accordance with the present novel concept shown on an associated vehicle.

Turning now to the drawings wherein the showings are for the purpose of illustrating exemplary embodiments of the present novel concept and not for the purpose of limiting the same, FIG. 1 illustrates an embodiment of a suspension system 100 disposed in operative association between a sprung mass, such as an associated vehicle body BDY, for example, and an unsprung mass, such as an associated wheel WHL or an associated axle AXL, for example, of an associated vehicle VHC. Suspension system 100 includes at least one fluid spring device, such as a plurality of fluid or air spring assemblies 102, for example, and at least one variable-rate damping device, such as a plurality of dampers or damping members 104, for example. Preferably, dampers 104 are capable of having the damping rate thereof varied between two or more damping rates in response to a non-fluid communication, such as an analog or digital electrical signal, message or communication, for example. One example of a suitable electronically variable damper includes a piston received in a cylinder. The piston has one or more orifices that can be varied in size or selectively opened and closed, such as by rotating a control rod, for example. The control rod can be connected to an electric motor, which can be selectively operated to alter the position and/or orientation of the control rod.

Suspension system 100 also includes a pressurized fluid supply system 106 operatively associated with the fluid spring devices for selectively supplying pressurized fluid thereto and selectively transferring pressurized fluid therefrom. In the exemplary embodiment shown in FIG. 1, fluid supply system 106 includes a pressurized fluid source, such as a compressor 108, for example, for generating pressurized air or other fluids. A valve assembly 110 is shown as being in communication with compressor 108 and can be of any suitable configuration or arrangement. In the exemplary embodiment shown, valve assembly 110 includes a valve block 112 with a plurality of valves (not shown) supported on the valve block and with corresponding valve actuators 114 operatively connected thereto for selectively opening and closing the valves. Valve assembly 110 can also include a suitable exhaust, such as a muffler 116, for example, for venting pressurized fluid from the system. Optionally, pressurized fluid supply system 106 can also include a reservoir 118 in fluid communication with valve assembly 110 and suitable for storing a quantity or volume of pressurized fluid.

Valve assembly 110 can be placed in communication with air springs 102 in any suitable manner, such as through fluid transmission lines 120, for example. As such, pressurized fluid can be selectively transmitted to and/or from the fluid spring devices through valve assembly 110, such as to alter or maintain vehicle height at one or more corners of the vehicle, for example.

Suspension system 100 also includes a control system 122 in communication with various systems and components of the suspension system for selective operation and control thereof. Control system 122 can include components of any suitable type and/or kind, and in any suitable arrangement or configuration. In the embodiment shown, the control system includes a controller or electronic control unit 124 in communication with compressor 108 and valve assembly 110 in a suitable manner, such as through suitable leads or connections (not shown), for example. The controller being adapted to selectively operate and/or control compressor 108 and valve assembly 110, such as for supplying and exhausting pressurized fluid to and from fluid spring assemblies 102, for example. Additionally, controller 124 is in communication with damping members 104 for selectively adjusting the damping rate thereof in a suitable manner, such as by generating damper control signals and communicating the damper control signals to the dampers through a suitable conductor or lead (not shown), for example.

Control system 122 is also operative to monitor the fluid pressure within fluid supply system 106 and can do so in any suitable manner. For example, the control system can include a pressure sensor 126 in operative association with valve assembly 110. By selectively opening and closing the valves of valve block assembly 110, the fluid pressure in reservoir 120 and/or one or more of individual air springs 102 can be placed in communication with pressure sensor 126, as will be understood by those of skill in the art. As such, pressure sensor 126 can generate pressure signals having a relation to the fluid pressure in the reservoir and/or each of the air springs and communicate these pressure signals to a suitable component or system, such as controller 124, for example. Alternately, multiple pressure sensors can be used, such as pressure sensors 126' and/or 126", for example. In one embodiment, pressure sensors 126' are disposed along transmission lines 120 and are operative to generate signals corresponding to the fluid pressure in the air springs corresponding to the associated fluid lines. In another embodiment, pressure sensors 126" are disposed along the air springs themselves. Accordingly, it will be appreciated that any suitable type, kind or arrangement of pressure sensing devices can be used and that the same, in whichever manner provided, are operative to communicate a signal having a relation to the fluid pressure of the fluid spring devices and/or reservoir to the controller.

Additionally, control system 122 can also optionally include one or more height sensing devices, such as height sensors 128, for example. The height sensing devices can be of any suitable type or kind (e.g., mechanically-linked rotary potentiometers, linear transducers, ultrasonic wave sensors, electromagnetic wave sensors), and can be provided in any suitable arrangement or configuration. In one exemplary embodiment, height sensors 128 are operatively associated with fluid spring assemblies 102 for outputting signals indicative of a height of the fluid spring or the distance between components of the vehicle. Height sensors 128 are in communication with controller 124 in a suitable manner, such as through leads or connections (not shown), for example, and controller 124 receives the height or distance signals from the height sensors.

Control system 122 can also optionally include a speed sensing device, such as speed sensor 130, for example, in communication with controller 124 in a suitable manner, such a through a suitable connection or lead 132, for example. The speed sensing device is operative to generate speed sensor signals indicative the speed of the vehicle and communicate the speed sensor signals to a suitable system or component, such as controller 124, for example. Additionally, control system 122 can optionally include an operator interface and/or selection device, such as may be suitable for communicating information, communications, data and/or signals of any suitable type or kind to an operator and/or receiving input information, communications, data and/or signals of any suitable type or kind from an operator. One example of a suitable operator selection device is shown in FIG. 1 as including a selector switch 134 and a plurality of indicator lamps 136 in communication with controller 124 through a suitable connection or lead 138. It will be appreciated, however, that any other suitable device, component and/or arrangement can alternately be used. For example, a plurality of switches or buttons, or a touch-screen display could alternately be used.

Controller 124 can be of any suitable type, kind and/or construction. In the exemplary embodiment shown, controller 124 includes a processing device 140 which can be of any suitable type and/or kind, such as a microprocessor, microcomputer or microcontroller, for example. Additionally, controller 124 can optionally include a memory 142 in communication with processing device 140. Memory 142 can be of any suitable type or kind, such as a volatile or non-volatile memory, for example, and is preferably suitable for receiving and/or storing data, values, signals, information, communications, algorithms and/or routines in any suitable form or format, such as in the form of software programs or code, for example.

Figure 2:
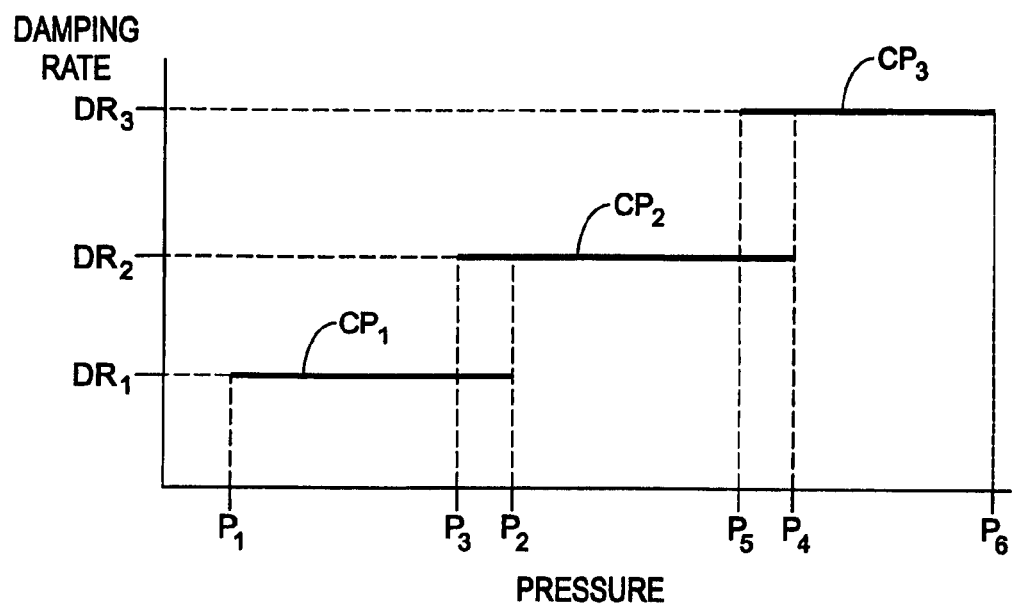
FIG. 2 is a graphical representation of pressure versus damping rate.

In use, suspension system 100 is operative to adjust the damping rate of one or more variable-rate dampers, such as at least one of damping members 104, for example, in response to variations in vehicle condition-related inputs which can be of any suitable type or kind, such as variations in the fluid pressure of the air spring assemblies, variations in the load on the vehicle, variations in vehicle speed, or variations in operator input, for example. As one example of a vehicle condition-related input, FIG. 2 shows a plurality of conditions involving a fluid pressure level. More specifically, FIG. 2 includes a first vehicle-related condition $CP_1$ represented by a line extending from about pressure level $P_1$ to about pressure level $P_2$ and corresponding to a first damping rate $DR_1$. FIG. 2 also illustrates second and third vehicle-related conditions $CP_2$ and $CP_3$. Condition $CP_2$ is represented by a line extending from about a pressure level $P_3$ to about $P_4$, and corresponds to a second damping rate $DR_2$. Condition $CP_3$ is represented by a line extending from about a pressure level $P_5$ to about $P_6$, and corresponds to a third damping rate $DR_3$. Thus, under vehicle condition $CP_1$ in which a pressure level, such as the fluid pressure level in one or more of air spring assemblies 102, for example, is about or between pressure levels $P_1$ and $P_2$, the damping rate of one or more dampers, such as one or more of damping members 104, for example, can be set at approximately first damping rate $DR_1$. Suspension system 100, and particularly control system 122 thereof, operates similarly for conditions $CP_2$ and $CP_3$. Additionally, it will be appreciated that some overlap in pressure levels, such as between $P_2$ and $P_3$ or between $P_4$ and $P_5$ can occur and that either vehicle condition may be selected in such circumstances.

While it will be appreciated that suspension system 100 can operate in any suitable manner, in one exemplary manner of operation controller 124 receives a pressure signal having a relation to a fluid pressure from a pressure sensing device, such as pressure sensor 126 (or 126' or 126"), for example. The controller is then operative to determine a corresponding damping rate based on the vehicle condition corresponding to the fluid pressure level. Controller 124 is then operative to generate a damper control signal having a relation to the corresponding damping rate and communicate the damper control signal to at least one damping device, such as one or more of dampers 104, for example. The one or more damping members, or components thereof, receive the damper control signal and operate at approximately the corresponding damping rate.

Figure 3:
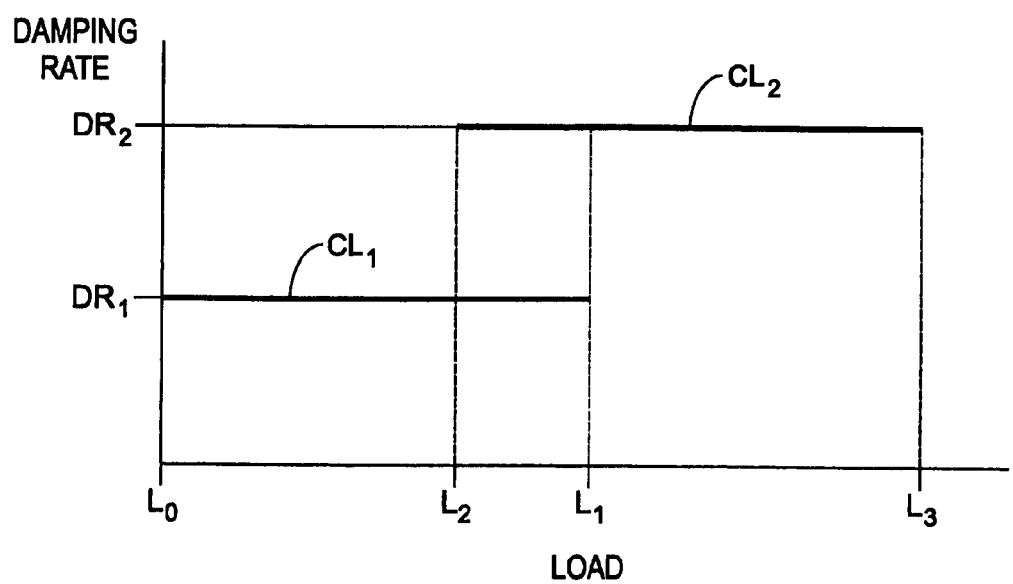
FIG. 3 is a graphical representation of load versus damping rate.

FIG. 3 illustrates another example of a vehicle condition-related input and shows a plurality of vehicle conditions involving the weight of a load acting on the vehicle. More specifically, FIG. 3 includes a first vehicle-related condition $CL_1$ represented by a line extending from about an initial or unloaded level $L_0$ to about a moderate load level $L_1$, and which corresponds to a first damping rate $DR_1$. A second vehicle-related condition $CL_2$ is represented by a line extending from about a moderate load level $L_2$ to a high load level $L_3$. It will be appreciated that some overlap in weight or load levels, such as between $L_1$ and $L_2$ can occur and that either vehicle condition may be selected in such circumstances.

In another exemplary manner of operation of suspension system 100, controller 124 is operative to determine a weight of a load on the vehicle or a portion thereof, such as at a weight on vehicle corner, side (e.g., left or right) or end (e.g., front or rear), for example. It will be appreciated that the weight of the load can be determined in any suitable manner, such as by determining the same from a fluid pressure and air spring height, for example. Regardless of the manner in which the weight of the load is determined, controller 124 is operative to determine a damping rate corresponding to the load, and generate a damper control signal having a relation to the corresponding damping rate. The damper control signal can then be communicated to at least one damping device, such as one or more of dampers 104, for example. The one or more damping members, or components thereof, receive the damper control signal and operate at approximately the corresponding damping rate.

Figure 4:
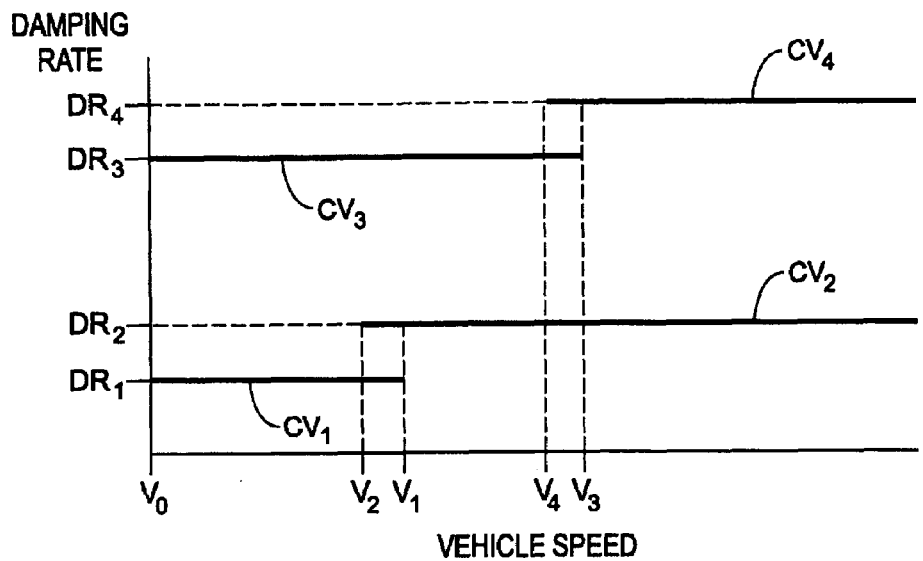
FIG. 4 is a graphical representation of vehicle speed versus damping rate.

FIG. 4 illustrates still another example of a vehicle condition-related input and shows a plurality of vehicle conditions involving the speed of the associated vehicle. Additionally, however, the plurality of vehicle conditions involve a second vehicle condition-related input, such as pressure or load as discussed above, for example. For purposes of discussion, a vehicle load will be used as the second vehicle condition-related input. However, it is to be understood that any other suitable input could alternately be used, and that the use of vehicle load is merely exemplary. FIG. 4 includes a first vehicle condition $CV_1$ that is represented by a line extending from about an initial or zero velocity level $V_0$ to about a first velocity level $V_1$, and which corresponds to a first damping rate $DR_1$. A second vehicle condition $CV_2$ is represented by a line extending from about a second velocity level $V_2$ to a high velocity level (not numbered), which corresponds to a second damping rate $DR_2$. Additionally, first and second vehicle conditions $CV_1$ and $CV_2$ correspond to a first vehicle load condition, such as condition $CL_1$ shown in and discussed with regard to FIG. 3, for example.

FIG. 4 also includes a third vehicle condition $CV_3$ that is represented by a line extending from about an initial or zero velocity level $V_0$ to about a third velocity level $V_3$, and which corresponds to a third damping rate $DR_3$. A fourth vehicle condition $CV_4$ is represented by a line extending from about a fourth velocity level $V_4$ to the high velocity level (not numbered) that is discussed above. The fourth vehicle condition corresponds to a fourth damping rate $DR_4$. Third and fourth vehicle conditions $CV_3$ and $CV_4$ correspond to a second vehicle load condition, such as condition $CL_2$ shown in and discussed with regard to FIG. 3, for example. It will be appreciated that some overlap in velocity levels, such as between $V_1$ and $V_2$ or between $V_3$ and $V_4$ can occur and that either vehicle condition may be selected in such circumstances.

In a further exemplary manner of operation of suspension system 100, controller 124 is operative to determine the speed of the associated vehicle, such as by receiving a speed signal from speed sensing device 130, for example. Additionally, a second vehicle condition-related input, such as the weight of a load on the associated vehicle, for example, can be determined in a suitable manner, such as by using controller 124 as discussed above, for example. In the present example, the controller is operative to determine the load on the vehicle and select a corresponding group of vehicle conditions, such as conditions $CV_1$ and $CV_2$ or conditions $CV_3$ and $CV_4$, for example, based on the determined load. Controller 124 is then operative to receive a speed signal from the speed sensing device, and determine a speed of the vehicle therefrom. Based upon the determined vehicle speed, the controller can then determine a corresponding damping rate, and generate a damper control signal having a relation to the corresponding damping rate. The damper control signal can then be communicated to at least one damping device, such as one or more of dampers 104, for example. The one or more damping members, or components thereof, receive the damper control signal and operate at approximately the corresponding damping rate.

Figure 5:
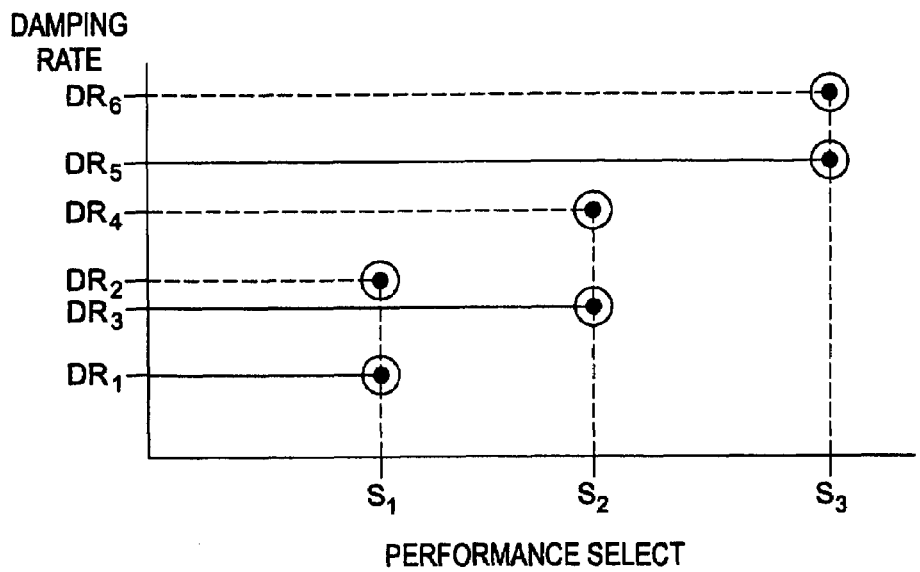
FIG. 5 is a graphical representation of driver selected performance level versus damping rate.

FIG. 5 illustrates a further example of a vehicle condition-related input and shows a plurality of vehicle conditions involving an operator or driver generated input. While it will be appreciated that a selected input of any suitable type or kind can be included, the present example includes a performance-related input in which the operator selects between various damping rate groups or performance categories. More specifically, FIG. 5 shows a first selection $S_1$, a second selection $S_2$ and a third selection $S_3$. In one exemplary embodiment, each selection will have a direct relation to a corresponding input or performance characteristic, such as damping rate, for example. Alternately, one or more additional vehicle condition-related inputs, such as pressure, load or speed as discussed above, for example, can be involved. For example, as illustrated in FIG. 5, each selection (e.g., $S_1$, $S_2$ and $S_3$) includes two corresponding damping rates, with first selection $S_1$ corresponding to first and second damping rates $DR_1$ and $DR_2$, second selection $S_2$ corresponding to third and fourth damping rates $DR_3$ and $DR_4$, and third selection $S_3$ corresponding to fifth and sixth damping rates $DR_5$ and $DR_6$. Thus, which of the two corresponding damping rates are used for a given selection can depend upon one or more other vehicle condition-related inputs, such as pressure, load and/or speed, for example.

In still another manner of operation of suspension system 100, controller 124 is operative to receive an input signal from an operator interface or user input device, such as selector switch 134, for example. Optionally, the controller is also operative to determine one or more input levels, such as a pressure level of an air spring assembly, a weight of a load on the associated vehicle, and/or a vehicle speed, for example, using a suitable system or component. The controller is then operative to determine a damping rate based at least in part on the input signal and the determined input levels. The controller can then generate a damper control signal having a relation to the corresponding damping rate. The damper control signal can then be communicated to at least one damping device, such as one or more of dampers 104, for example. The one or more damping members, or components thereof, receive the damper control signal and operate at approximately the corresponding damping rate.

Figure 6:
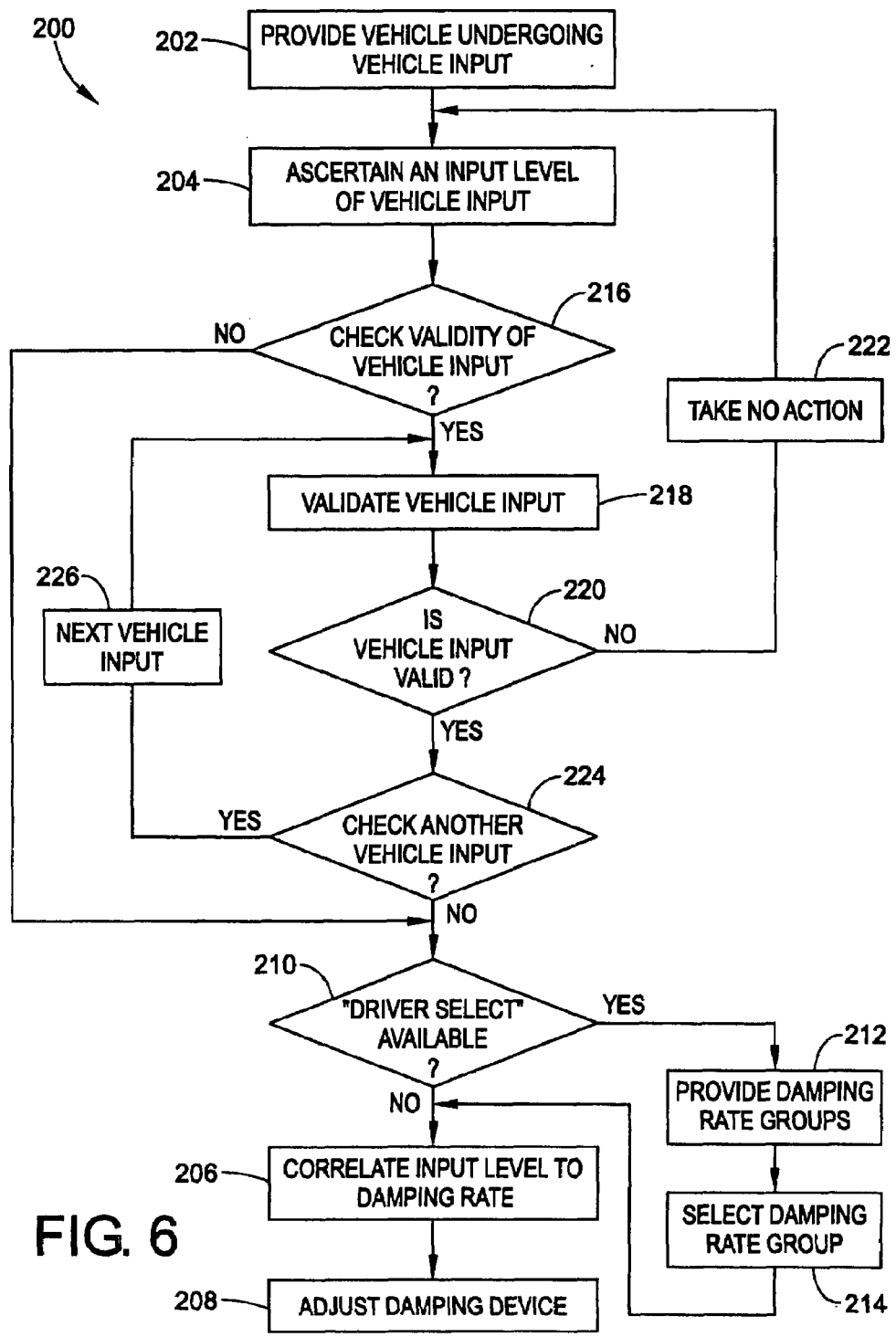
FIG. 6 is a representation of one exemplary method in accordance with the present novel concept of controlling a suspension system of an associated vehicle.

As discussed above, suspension system 100 can include any suitable systems and/or components and can be operative in any suitable manner to vary the damping rate of one or more damping members based upon one or more vehicle inputs. As such, suspension system 100 can include in any suitable method or methods of operation. One exemplary method 200 is shown in FIG. 6 and includes providing a vehicle undergoing a condition-related input, such as a fluid pressure level, a weight of a load or a vehicle speed, for example, as indicated in box 202. Method 200 also includes ascertaining or otherwise determining an input level, such as data, values, signals and/or information, for example, having a relation to the condition related input, as indicated in box 204. Method 200 further includes correlating the determined input level with a damping rate, as indicated in box 206. Method 200 also includes adjusting one or more damping devices, such as one or more of damping members 104, for example, to operate at approximately the correlated damping rate, as indicated in box 208.

Optionally, suspension system 100 can include an input device, such as selector switch 134, for example, that is capable of permitting a driver or operator to select or otherwise communicate a user input. As such, method 200 can optionally include a determination as to whether such a "Driver Select" input is available, as indicated in decision box 210. If a NO determination is made at decision box 210, method 200 proceeds to box 206 and correlates the determined input level to a damping rate. If a YES determination is reached as decision box 210, method 200 includes providing a plurality of damping rate groups, such as a first group including damping rates $DR_1$ and $DR_2$ corresponding to selection $S_1$, a second group including damping rates $DR_3$ and $DR_4$ corresponding so selection $S_2$, and a third group including damping rates $DR_5$ and $DR_6$ corresponding to selection $S_3$ as shown in FIG. 5, for example, as indicated in box 212. Furthermore, method 200 can optionally include receiving or otherwise determining the driver input and selecting the corresponding damping rate group from the provided plurality of damping rate groups, as indicated in box 214. Method 200 then proceeds to box 206 and correlates the determined input level to a damping rate from the selected group of damping rates. The one or more damping devices can then be adjusted to operate at the damping rate, as indicated in box 208.

Control system 122 of suspension system 100 can also optionally include confirming the validity of any vehicle inputs and/or corresponding input levels, in any suitable manner. As such, method 200 can optionally include a checking the validity of a vehicle input and/or corresponding input level, as indicated in decision box 216. If a NO determination is reached at decision box 216, then no check of the validity is to be made and method 200 proceeds to box 206 or optionally to box 210, if provided. If a YES determination is reached at decision box 216, method 200 includes validating the vehicle inputs and/or input levels, as indicated at box 218. A decision box 220 is then reached and an inquiry is made as to whether the vehicle input and/or input level is valid. If a NO determination is reached, no action is taken, as indicated by box 222, and method 200 returns to box 204 to determine another vehicle input and/or input level. If a YES determination is reached at decision box 220, method 200 proceeds to decision box 224 at which an inquiry is made as to whether another vehicle input and/or input level is to validated. If a YES determination is made, method 200 selects the next vehicle input and/or input level to be checked, as indicated in box 226, and proceeds to validate the next vehicle input and/or input level at box 218. If a NO determination is reached at decision box 224, method 200 proceeds to box 206 or optionally to box 210, if provided.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A control system for an associated suspension system of an associated vehicle, the associated suspension system including an associated fluid spring operating at an associated fluid pressure and an associated variable-rate damper having an associated electronically-variable damping rate, the associated fluid spring having an associated overall pressure range within which substantially all operation of the associated fluid spring occurs and which includes the associated fluid pressure, the associated damper having an associated overall damping rate range within which substantially all operation of the associated variable-rate damper occurs and which includes the associated damping rate, said control system comprising:

a pressure sensor operative to generate a pressure sensor signal indicative of the associated fluid pressure of the associated fluid spring; and, a controller in communication with said pressure sensor and the associated variable-rate damper, said controller including a memory storing first through sixth damping rates having values within the associated overall damping rate range, and said memory storing a plurality of pressure ranges that together include substantially all of the associated overall pressure range with each of said plurality of pressure ranges being stored in said memory in respective association with one of said first through sixth damping rates; and, said controller is being operative to receive said pressure sensor signal, identify said one of said first through sixth damping rates based at least in part on said pressure sensor signal by determining which one of said plurality of pressure ranges the associated fluid pressure falls within, and generate a damper adjustment signal corresponding to said identified one of said first through sixth damping rates for adjusting the associated electronically-variable damping rate of the associated variable-rate damper.

2. A control system according to claim 1, wherein the associated vehicle is undergoing an associated vehicle input, and said control system further comprises an input sensing device in communication with said controller and operative to generate a sensing device signal having a relation to the associated vehicle input, and said controller is operative to receive said sensing device signal and identify said one of said first through sixth damping rates based at least in part on said pressure sensor signal and said sensing device signal.

3. A control system according to claim 2, wherein the associated vehicle input is an associated vehicle height, said input sensing device is a height sensor operative to generate a height signal as said sensing device signal, said height signal having a relation to the associated vehicle height, and said controller is in communication with said height sensor and receives said height signal therefrom, said controller operative to identify said one of said first through sixth damping rates based at least in part on said pressure sensor signal and said height signal.

4. A control system according to claim 3, wherein said plurality of pressure ranges are stored in said memory as a plurality of load values with at least one of said first through sixth damping rates corresponding to one of said plurality of load values, and said controller is operative to determine an associated vehicle load value based at least in part upon said pressure sensor signal and said height signal, and said controller is operative to identify said one of said first through sixth damping rates based upon a comparison of the associated vehicle load value with said plurality of load values.

5. A control system according to claim 2, wherein the associated vehicle input is an associated vehicle speed, said input sensing device is a speed sensing device operative to generate a speed signal having a relation to the associated vehicle speed, and said controller is in communication with said speed sensing device and receives said speed signal therefrom, said controller operative to identify said one of said first through sixth damping rates based at least in part on said pressure sensor signal and said speed signal.

6. A control system according to claim 2 further comprising an operator selection device in communication with said controller, said operator selection device operative to generate an output state signal corresponding to one output state of a plurality of available output states, said controller receiving said output state signal and operative to identify said one of said first through sixth damping rates based at least in part upon said pressure sensor signal and said output state signal.

7. A control system according to claim 6, wherein said first through sixth damping rates are separated into a first plurality of damping rates and a second plurality of damping rates, said memory storing said first plurality of damping rates in association with a first output state of said plurality of available output states and said second plurality of damping rates in association with a second output state of said plurality of available output states, said controller is operative to select one of said first and second pluralities of damping rates based at least in part on said output state signal, and said controller is operative to identify said one of said first through sixth damping rates from said selected one of said first and second pluralities of damping rates based at least in part upon said pressure sensor signal.

8. A vehicle suspension system for an associated vehicle having an associated unsprung mass and an associated sprung mass supported on the associated unsprung mass, said vehicle suspension system comprising:
a fluid spring assembly operatively disposed between the associated sprung and unsprung masses and operating at a fluid pressure;
an adjustable-rate damping member operatively disposed between the associated sprung and unsprung masses; and,
a control system including a pressure sensor and a controller, said pressure sensor in communication with said fluid spring assembly and operative to generate a pressure signal corresponding to said fluid pressure, said controller in communication with said pressure sensor for receiving said pressure signal and in communication with said adjustable-rate damping member, said controller including a memory storing first through sixth predetermined damping rate values and a plurality of pressure ranges with each of said plurality of pressure ranges associated with at least one of said first through sixth damping rates, and said controller being capable of identifying said one of said first through sixth damping rates based at least in part on which one of said plurality of pressure ranges said fluid pressure falls within such that said control system is operable to:
select a damping rate value for said adjustable-rate damping member from said first through sixth damping rate values stored in said memory based at least in part on said pressure signal;
generate a damper adjustment signal corresponding to said selected damping rate value; and,
communicate said damper adjustment signal to said adjustable-rate damping member.

9. A vehicle suspension system according to claim 8, wherein the associated vehicle includes an associated vehicle input, and said vehicle suspension system further comprises a sensing device in communication with said controller and operable to generate a sensing device signal having a relation to the associate vehicle input such that said control system is operative to select said damping rate value for generation of said damper adjustment signal based at least in part on said pressure signal and said sensing device signal.

10. A vehicle suspension system according to claim 9, wherein the associated vehicle input is an associated distance between the associated sprung and unsprung masses of the associated vehicle, said sensing device is a height sensor operative to generate a height signal having a relation to the associated distance, and said controller is adapted to receive said height signal such that said control system is operative to select said damping rate value for generation of said damper adjustment signal based at least in part upon said pressure signal and said height signal.

11. A vehicle suspension system according to claim 9, wherein the associated vehicle input is an associated vehicle speed, said sensing device is a speed sensor operative to generate a speed signal having a relation to the associated vehicle speed, and said controller is adapted to receive said speed signal such that said control system is operative to select said damping rate value for generation of said damper adjustment signal based at least in part upon said pressure signal and said speed signal.

12. A vehicle suspension system according to claim 9, wherein said control system includes a selection device in communication with said controller and operative to receive a user-inputted selection and generate a selection output signal corresponding to said user-inputted selection, said controller receiving said selection output signal such that said control system is operative to select said damping rate value for generation of said damper adjustment signal based at least in part upon said pressure signal and said selection output signal.

13. A vehicle suspension system according to claim 8, wherein said fluid spring assembly is one fluid spring assembly of a plurality of fluid spring assemblies, said adjustable-rate damping member is one adjustable-rate damping member of a plurality of adjustable-rate damping members, said pressure sensor is one pressure sensor of a plurality of pressure sensors, each fluid spring assembly is operating at a fluid pressure, and one pressure sensor of said plurality of pressure sensors is operatively associated with each fluid spring assembly of said plurality of fluid spring assemblies, and each pressure sensor is operative to generate a pressure signal having a relation to said fluid pressure of said operatively associated fluid spring assembly.

14. A vehicle suspension system according to claim 13, wherein each pressure sensor of said plurality of pressure sensors is in communication with said controller, and said controller receives said pressure signal from each of said pressure sensors such that said control system is operative to select said damping rate value for generation of at least one damper adjustment signal based at least partially on said pressure signal and communicate said at least one damper adjustment signal to one or more of said plurality of adjustable-rate damping members.

15. A method of controlling a suspension system of a vehicle, the suspension system including an adjustable-rate damper and an air spring operating at an air pressure, said method comprising:
   a) providing a pressure sensor in communication with the air spring and generating a pressure signal having a relation to said air spring pressure using said pressure sensor;
   b) providing an electronic controller in communication with said pressure sensor and said adjustable-rate damper, said electronic controller including a memory storing no more than six predetermined damping rate values and a plurality of air pressure ranges with each air pressure range of said plurality of air pressure ranges being associated with one of said no more than six predetermined damping rate values;
   c) communicating said pressure signal from said pressure sensor to said electronic controller;
   d) identifying a target damping rate from one of said no more than six predetermined damping rate values using said electronic controller based at least partially on said pressure signal by comparing said air spring pressure with said plurality of air pressure ranges and selecting said target damping rate based upon which of said plurality of air pressure ranges said air spring pressure falls within;
   e) generating a damper adjustment signal having a relation to said target damping rate using said electronic controller and communicating said damper adjustment signal to the adjustable-rate damper; and,
   f) altering the adjustable-rate damper for operation at approximately said target damping rate using said damper adjustment signal.

16. A method according to claim 15, wherein the vehicle includes a first input condition and said method further comprises:
   g) providing a sensing device in communication with said controller and generating a sensor signal having a relation to the first input condition; and,
   h) communicating said sensor signal to said controller; and,
      wherein d) includes identifying said target damping rate based at least partially on said pressure signal and said sensor signal.

17. A method according to claim 16 further comprising determining whether at least one of said pressure signal or said sensor signal represents a valid signal level, and ignoring one or more of said actions if at least one of said pressure signal or said sensor signal is determined to be invalid.

18. A method according to claim 16, wherein the first input condition includes a height condition and said sensing device is operative to generate a height signal having a relation to the height condition, and h) includes communicating said height signal to said controller and d) includes identifying said target damping rate based at least partially on said pressure signal and said height signal.

19. A method according to claim 18, wherein the first input condition includes a vehicle load at least partially contributing to the height condition, and d) includes determining a load value having a relation to the vehicle load based at least in part on said pressure signal and said height signal and identifying said target damping rate based at least in part on said load value.

* * * * *